United States Patent
Ottman (10) Patent No.: US 12,294,485 B1
(45) Date of Patent: May 6, 2025

(54) AUTOMATED GENERATION OF PATTERN-MATCHING RULES IN A RULE-BASED ANALYSIS SERVICE

(71) Applicant: Dell Products L.P., Round Rock, TX (US)

(72) Inventor: Tadd V. Ottman, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/432,247

(22) Filed: Feb. 5, 2024

(51) Int. Cl.
*H04L 41/0681* (2022.01)
*H04L 41/0663* (2022.01)
(Continued)

(52) U.S. Cl.
CPC ...... *H04L 41/0681* (2013.01); *H04L 41/0663* (2013.01); *H04L 41/069* (2013.01); *H04L 41/5032* (2013.01); *H04L 41/5048* (2013.01)

(58) Field of Classification Search
CPC ............... G06F 11/0709; G06F 11/079; G06F 11/0793; H04L 41/06; H04L 41/0631; H04L 41/0654; H04L 41/0659; H04L 41/0661; H04L 41/0663; H04L 41/0681; H04L 41/069; H04L 41/50; H04L 41/5032; H04L 41/5048; H04L 41/5061; H04L 41/5074

See application file for complete search history.

(56) References Cited

U.S. PATENT DOCUMENTS

2004/0250122 A1* 12/2004 Newton ............... H04L 63/1425 726/2
2016/0004582 A1* 1/2016 Nagura ............... G06F 11/0793 714/15

(Continued)

OTHER PUBLICATIONS

Dell Technologies, "Dell EMC PowerStore Storage Family," Spec Sheet H18143.2.4, Apr. 2023, 9 pages.

(Continued)

*Primary Examiner* — Vivek Srivastava
*Assistant Examiner* — William C McBeth
(74) *Attorney, Agent, or Firm* — Ryan, Mason & Lewis, LLP (57) ABSTRACT

An apparatus comprises at least one processing device configured to generate an annotation for a pattern-matching rule in a rule-based analysis service specifying one or more asset-generic patterns, the generated annotation comprising instructions for writing additional pattern-matching rules in response to detecting the asset-generic patterns on specific information technology assets. The at least one processing device is also configured to monitor information associated with operation of information technology assets and to detect at least one of the asset-generic patterns of the pattern-matching rule on a given one of the information technology assets. The at least one processing device is further configured to generate a given additional pattern-matching rule in the rule-based analysis service specifying (i) asset-specific patterns and (ii) actions to take in response to detecting the asset-specific patterns. The at least one (Continued)

processing device is further configured to apply the actions for the given information technology asset.

20 Claims, 9 Drawing Sheets

(51) Int. Cl.
    *H04L 41/069*     (2022.01)
    *H04L 41/50*     (2022.01)
    *H04L 41/5041*     (2022.01)

(56) References Cited

U.S. PATENT DOCUMENTS

2017/0364404 A1* 12/2017 Yang .................... G06F 11/0793
2022/0239572 A1* 7/2022 Tao ...................... H04L 41/0631
2023/0099424 A1* 3/2023 Hawkinson ............ H04L 41/069
                                                                                              709/224

OTHER PUBLICATIONS

Dell Technologies, "Empowering DevOps Teams End to End Across the IT Infrastructure," Feb. 2022, 3 pages.
Dell Technologies, "Dell PowerStore T Model Specifications," Spec Sheet, Apr. 2023, 9 pages.
Dell Inc., "Assure Testing Services," E445, Aug. 2011, 4 pages.
Dell Technologies, "APEX," Jul. 2020, 10 pages.

* cited by examiner

Raised Error 18 on sys-5 today

305 grep -P 'Error 18 on sys-[0-9]+ '
Raised Error 18 on sys-5 today

310

Raised Error 18 on sys-2 today

315 grep -P 'Error 18 on sys-2 '
Raised Error 18 on sys-2 today

320 grep -P 'Error 18 on sys-1 '
grep -P 'Error 18 on sys-3 '
grep -P 'Error 18 on sys-5 '
grep -P 'Error 18 on sys-6 '
grep -P 'Error 18 on sys-2 '

FIG. 3

```
                                      400
                                       ⌒
"deploy_error_18": {
      "type": "point",
      "signature": {
            "start_str": "INFO. .* Error 18: Problem with MAC",
            "end_str": null,
            "log_file": "xpool.log",
            "log_type": "notime"
      },
      "is_true": false,
      "blob": null
      ]
},
"cluster_WX ": {
      "type": "point",
      "signature": {
            "start_str": "INFO.  =========== handling WX-.*? ",
            "end_str": null,
            "log_file": "xpool.log",
            "log_type": "notime"
      },
      "is_true": false,
      "blob": null
},
```

```
"CASE-643": {
      "desc": "Deploy error 18 on WX",
      "sym_list": [
            "deploy_error_18",
            "cluster_WX"
      ],
      "conditions": "c1&c2",
      "remark": "Duplicating to CASE-643",
      "action": "do_dup",
      "disable": false
},
```

410

```
"CASE-643": {
      "desc": "Deploy error 18 on WX",
      "sym_list": [
            "deploy_error_18",
            "cluster_WX"
      ],
      "conditions": "c1&c2",
      "remark": "Duplicating to CASE-643",
      "action": "do_dup",
      "add_diagnosis": true,
      "disable": false
},
```

```
"cluster_WX ": {
      "type": "point",
      "signature": {
            "start_str": "(?<=INFO.  =========== handling )WX-.*?(?= )",
            "end_str": null,
            "log_file": "xpool.log",
            "log_type": "notime"
      },
      "broad": true,
      "is_true": false,
      "blob": null
},
```

420

```
{
   "deploy_error_18": [
      "xpool.log:[ NzI0YjE1] 2021-11-05 11:09:56 [INFO]    Error 18: Problem with MAC"
   ],
   "cluster_WX": [
      "xpool.log:[NzI0YjE1] 2021-11-05 11:09:11 [INFO]  =========== handling WX-D1311 ====="
   ]
}
```

```
"specific_WX-D1311": {
    "type": "point",
    "signature": {
        "start_str": "(?<=INFO.  =========== handling )WX-D1311(?= )",
        "end_str": null,
        "log_file": "xpool.log",
        "log_type": "notime"
    },
    "is_true": false,
    "blob": null
},
```

430

```
"CASE-688": {
    "desc": "Instance of CASE-643 specifically WX-D1311",
    "sym_list": [
        "deploy_error_18",
        "specific_WX-D1311"
    ],
    "conditions": "c1&c2",
    "remark": "Duplicating to CASE-688",
    "action": "do_dup",
    "disable": false
},
```

AUTOMATED GENERATION OF PATTERN-MATCHING RULES IN A RULE-BASED ANALYSIS SERVICE

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for automated generation of pattern-matching rules in a rule-based analysis service.

In one embodiment, an apparatus comprises at least one processing device comprising a processor coupled to a memory. The at least one processing device is configured to generate an annotation for a pattern-matching rule in a rule-based analysis service for an information technology infrastructure environment, the pattern-matching rule specifying one or more asset-generic patterns, the generated annotation comprising instructions for writing one or more additional pattern-matching rules in the rule-based analysis service in response to detecting at least one of the one or more asset-generic patterns on specific ones of a plurality of information technology assets in the information technology infrastructure environment. The at least one processing device is also configured to monitor information associated with operation of the plurality of information technology assets in the information technology infrastructure environment and to detect, based at least in part on the monitored information, at least one of the one or more asset-generic patterns of the pattern-matching rule on a given one of the plurality of information technology assets. The at least one processing device is further configured to generate a given additional pattern-matching rule in the rule-based analysis service, the given additional pattern-matching rule specifying (i) one or more asset-specific patterns and (ii) one or more actions to take in response to detecting at least one of the one or more asset-specific patterns. The at least one processing device is further configured to apply the one or more actions for the given information technology asset.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
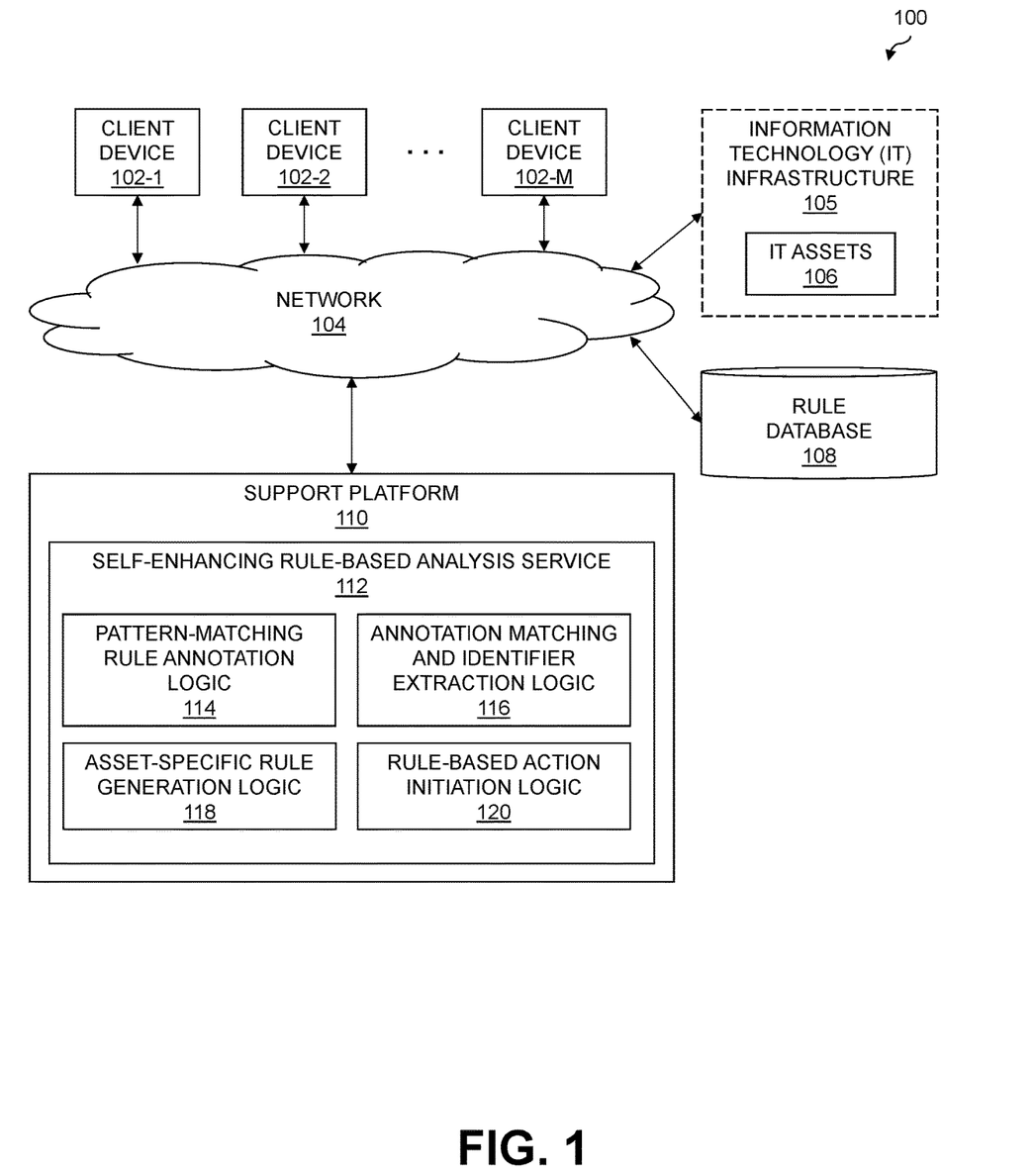
FIG. 1 is a block diagram of an information processing system configured for automated generation of pattern-matching rules in a rule-based analysis service in an illustrative embodiment.

FIG. 1 shows an information processing system 100 configured in accordance with an illustrative embodiment. The information processing system 100 is assumed to be built on at least one processing platform and provides functionality for automated generation of pattern-matching rules in a rule-based analysis service. The information processing system 100 includes a set of client devices 102-1, 102-2, ... 102-M (collectively, client devices 102) which are coupled to a network 104. Also coupled to the network 104 is an IT infrastructure 105 comprising one or more IT assets 106, a rule database 108, and a support platform 110 implementing a self-enhancing rule-based analysis service 112. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing IT assets 106 of the IT infrastructure 105 operated by that enterprise. Users of the enterprise (e.g., software developers, test engineers or other employees, customers or users which may be associated with different ones of the client devices 102) may utilize the self-enhancing rule-based analysis service 112 to analyze logs or other information generated by one or more of the IT assets 106 of the IT infrastructure 105. Such logs or other information may be generated as a result of testing of the IT assets 106 in a testing environment, running one or more workloads on the IT assets 106 in a non-testing environment (e.g., a production environment), etc. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The rule database 108 is configured to store and record various information that is utilized by the support platform 110, such as sets of IT asset-generic and IT asset-specific pattern matching rules, where such rules may define symptoms and associated diagnoses for remedying issues encountered on the IT assets 106, for evaluating testing of the IT assets 106, etc.). In some embodiments, one or more of storage systems utilized to implement the rule database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110 and/or the self-enhancing rule-based analysis service 112, as well as to support communication between the support platform 110, the self-enhancing rule-based analysis service 112 and other related systems and devices not explicitly shown.

The support platform 110 and/or the self-enhancing rule-based analysis service 112 may be provided as a cloud service that is accessible by one or more of the client devices 102 to allow users thereof to manage testing of the IT assets 106 of the IT infrastructure 105. The client devices 102 may be configured to access or otherwise utilize the support platform 110 and/or the self-enhancing rule-based analysis service 112 to perform testing of one or more of the IT assets 106. In some embodiments, the client devices 102 are assumed to be associated with software developers, test engineers, system administrators, IT managers or other authorized personnel responsible for managing testing for an enterprise. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, business, etc.). Various other examples are possible.

In some embodiments, the client devices 102 and/or the IT assets 106 of the IT infrastructure 105 may implement host agents that are configured for automated transmission of information with the support platform 110 and/or the self-enhancing rule-based analysis service 112 regarding testing of one or more of the IT assets 106 of the IT infrastructure 105. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements the self-enhancing rule-based analysis service 112, which includes pattern-matching rule annotation logic 114, annotation matching and identifier (ID) extraction logic 116, asset-specific rule generation logic 118, and rule-based action initiation logic 120. The pattern-matching rule annotation logic 114 is configured to define one or more pattern-matching rules which include annotations, where the annotations when matched trigger generation of IT asset-specific pattern-matching rules. The annotation matching and ID extraction logic 116 is configured to detect when an annotated pattern-matching rule is matched in a log (e.g., a testing log, a system log, etc. associated with one or more of the IT assets 106), and to extract an IT asset ID from the matched log. The asset-specific rule generation logic 118 is configured to generate a specific instance of a pattern-matching rule utilizing the IT asset ID extracted from the matched log. The rule-based action initiation logic 120 is configured to take various actions when the IT asset-specific pattern-matching rules are triggered.

At least portions of the self-enhancing rule-based analysis service 112, the pattern-matching rule annotation logic 114, the annotation matching and ID extraction logic 116, the asset-specific rule generation logic 118 and the rule-based action initiation logic 120 may be implemented at least in part in the form of software that is stored in memory and executed by a processor.

It is to be appreciated that the particular arrangement of the client devices 102, the IT infrastructure 105, the rule database 108 and the support platform 110 illustrated in the FIG. 1 embodiment is presented by way of example only, and alternative arrangements can be used in other embodiments. As discussed above, for example, the support platform 110 (or portions of components thereof, such as one or more of the self-enhancing rule-based analysis service 112, the pattern-matching rule annotation logic 114, the annotation matching and ID extraction logic 116, the asset-specific rule generation logic 118 and the rule-based action initiation logic 120) may in some embodiments be implemented internal to one or more of the client devices 102 and/or the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the rule database 108 and the support platform 110 or components thereof (e.g., the self-enhancing rule-based analysis service 112, the pattern-matching rule annotation logic 114, the annotation matching and ID extraction logic 116, the asset-specific rule generation logic 118 and the rule-based action initiation logic 120) may be implemented on respective distinct processing platforms, although numerous other arrangements are possible. For example, in some embodiments at least portions of the support platform 110 and one or more of the client devices 102, the IT infrastructure 105 and/or the rule database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the rule database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 5 and 6.

It is to be understood that the particular set of elements shown in FIG. 1 for automated generation of pattern-matching rules in a rule-based analysis service is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for automated generation of pattern-matching rules in a rule-based analysis service will now be described in more detail with reference to the flow diagram of FIG. 2. It is to be understood that this particular process is only an example, and that additional or alternative processes for automated generation of pattern-matching rules in a rule-based analysis service may be used in other embodiments.

In this embodiment, the process includes steps 200 through 208. These steps are assumed to be performed by the support platform 110 utilizing the self-enhancing rule-based analysis service 112, the pattern-matching rule annotation logic 114, the annotation matching and ID extraction logic 116, the asset-specific rule generation logic 118 and the rule-based action initiation logic 120. The process begins with step 200, generating an annotation for a pattern-matching rule configured in a rule-based analysis service for an IT infrastructure environment. The pattern-matching rule specifies one or more asset-generic patterns. The one or more asset-generic patterns may be defined utilizing a parameter which indicates an asset-generic symptom associated with one or more issues encountered on the plurality of IT assets. The generated annotation comprises instructions for writing one or more additional pattern-matching rules in a configuration of the rule-based analysis service in response to detecting at least one of the one or more asset-generic patterns on specific ones of a plurality of IT assets in the IT infrastructure environment.

In step 202, information associated with operation of the plurality of IT assets in the IT infrastructure environment are monitored. The monitored information may comprise one or more system logs. The one or more system logs may be generated in conjunction with execution of one or more test cases on the plurality of IT assets in a testing environment. The one or more system logs may alternatively be generated in conjunction with execution of one or more workloads on the plurality of IT assets in a production environment.

In step 204, at least one of the one or more asset-generic patterns of the pattern-matching rule are detected on a given one of the plurality of IT assets based at least in part on the monitored information.

In step 206, a given additional pattern-matching rule is generated in the rule-based analysis service. The given additional pattern-matching rule specifying (i) one or more asset-specific patterns and (ii) one or more actions to take in response to detecting at least one of the one or more asset-specific patterns. Step 206 may comprise extracting an asset identifier of the given IT asset from the monitored information and inserting the extracted asset identifier in at least one of the one or more asset-specific patterns. Extracting the asset identifier may be based at least in part on a regular expression in the at least one asset-generic pattern, the regular expression utilizing look-behind and look-ahead syntax for isolating the asset identifier of the given IT asset from the monitored information. The at least one asset-specific pattern may comprise the at least one asset-generic pattern having the regular expression replaced with the extracted asset identifier. In some embodiments, the pattern-matching rule is associated with a first reference case number and the given additional pattern-matching rule is associated with a second reference case number, the second reference case number being different than the first reference case number, where step 206 includes inserting a description indicating that the given additional pattern-matching rule comprises an instance of the first reference case number for the given IT asset.

In step 208, the one or more actions are applied for the given IT asset. The one or more actions to take in response to detecting at least one of the one or more asset-specific patterns specified in the given additional pattern-matching rule may be selected based at least in part on one or more actions specified in the pattern-matching rule, and may in some embodiments be the same. The one or more actions to take in response to detecting at least one of the one or more asset-specific patterns specified in the given additional pattern-matching rule may comprise: for a first detection of the at least one asset-specific pattern, generating a support ticket for the given IT asset; and for subsequent detection of the at least one asset-specific pattern following the first detection of the at least one asset-specific pattern, duplication of the support ticket for the given IT asset. The one or more actions to take in response to detecting at least one of the one or more asset-specific patterns specified in the given additional pattern-matching rule may also or alternatively comprise at least one of: generating a comment for a reference case; assigning the reference case to a support team; and linking the reference case to one or more related reference cases.

Figure 2:
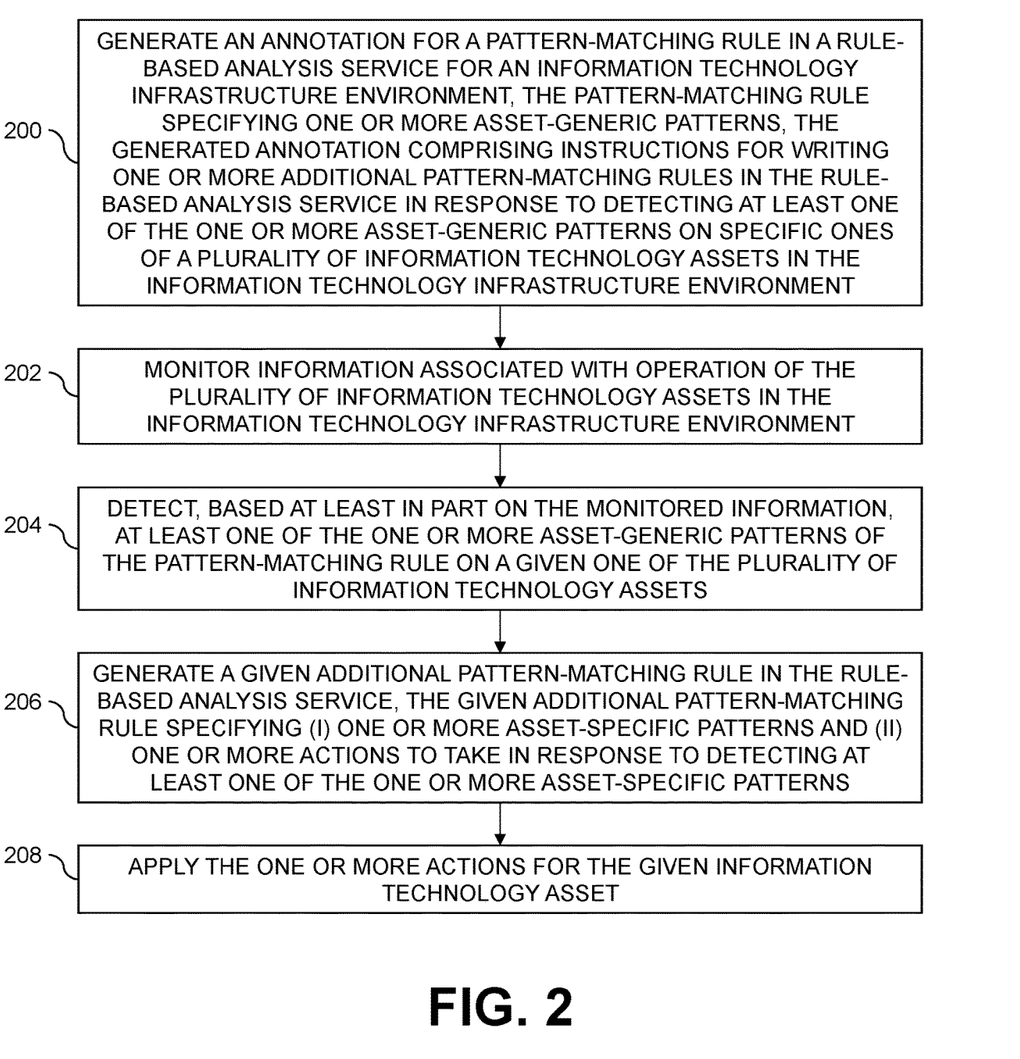
FIG. 2 is a flow diagram of an exemplary process for automated generation of pattern-matching rules in a rule-based analysis service in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different logs, for different IT assets, for different issues encountered on one or more IT assets, for different rule-based analysis services, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

When IT support engineers or other users analyze system information and logs to triage problems found in testing, they look for patterns and take actions according to the matches that are found. An automated triage service (e.g., a rule-based analysis service) may be similarly configured to look for patterns in system information and logs, and take automated actions based on a set of configured patterns and actions. While a human user is able to think of general pattern spaces, populated by predictable combinations of specific patterns, the automated triage service cannot do this as it is limited to specific configured patterns.

Illustrative embodiments provide technical solutions for enhancing an automated triage service for performing self-configuration of patterns, where details of a high-level pattern found in one instance may be used to generate a new specific pattern that augments an existing configuration of patterns of the automated triage service. Thus, the automated triage service is configured to recognize and act upon the newly-generated patterns when encountered in future runs. The technical solutions thus enable encoding simple, high-level patterns with self-enhancing annotations in a configuration of the automated triage service, and the automated triage service is enabled to generate specific low-level configurations for the particulars of any instance matching one of the general, high-level patterns having a self-enhancing annotation.

The technical solutions described herein thus increase the leverage value of automated triage services and other rule-based analysis services. Conventional approaches rely on the expertise of support engineers by applying rules that are manually written. Support engineers may leverage a self-enhancing automated triage service as described herein to provide significant resource savings, including reducing manual hours of triaging test failures or other issues. The technical solutions enable support engineers to leverage a self-enhancing automated triage service that is configured to automate the process of writing specific (e.g., low-level) pattern-matching rules from a set of general (e.g., high-level) pattern-matching rules.

When a general pattern-matching rule covers a huge combinatorial space, the technical solutions enable the automated triage service to generate specific pattern-matching rule configurations on-demand (e.g., for hot spots in that space), avoiding all logical possibilities which are not actually encountered in practice. For example, in a large pool of systems under test, only a few of the systems may repeatedly exhibit a particular hardware problem. The technical solutions enable an automated triage service to flag or otherwise recognize such repeated instances of the hardware problem without the burden of having to manually write specific pattern-matching rules for every system in the pool of systems under test.

Conventional approaches for implementing a triage service are only able to detect patterns which are specifically and manually configured. When code developed for appliances or other IT assets suddenly spawns a large category of possible test failures that are generally the same but differ in important details, conventional triage services can only recognize duplicate failures at the granularity of manually-configured pattern-matching rules. If a detected pattern is too general, failures which are importantly different are inaccurately lumped together. If the detected pattern is too specific, there are several technical problems, including that: the manual effort to define the patterns takes too much time and effort; the triage service requires a reference case for each defined pattern, where for many possibilities in the combinatorial space, no case has been encountered; and monitoring for new reference cases takes too much time and is error-prone.

Figure 3:
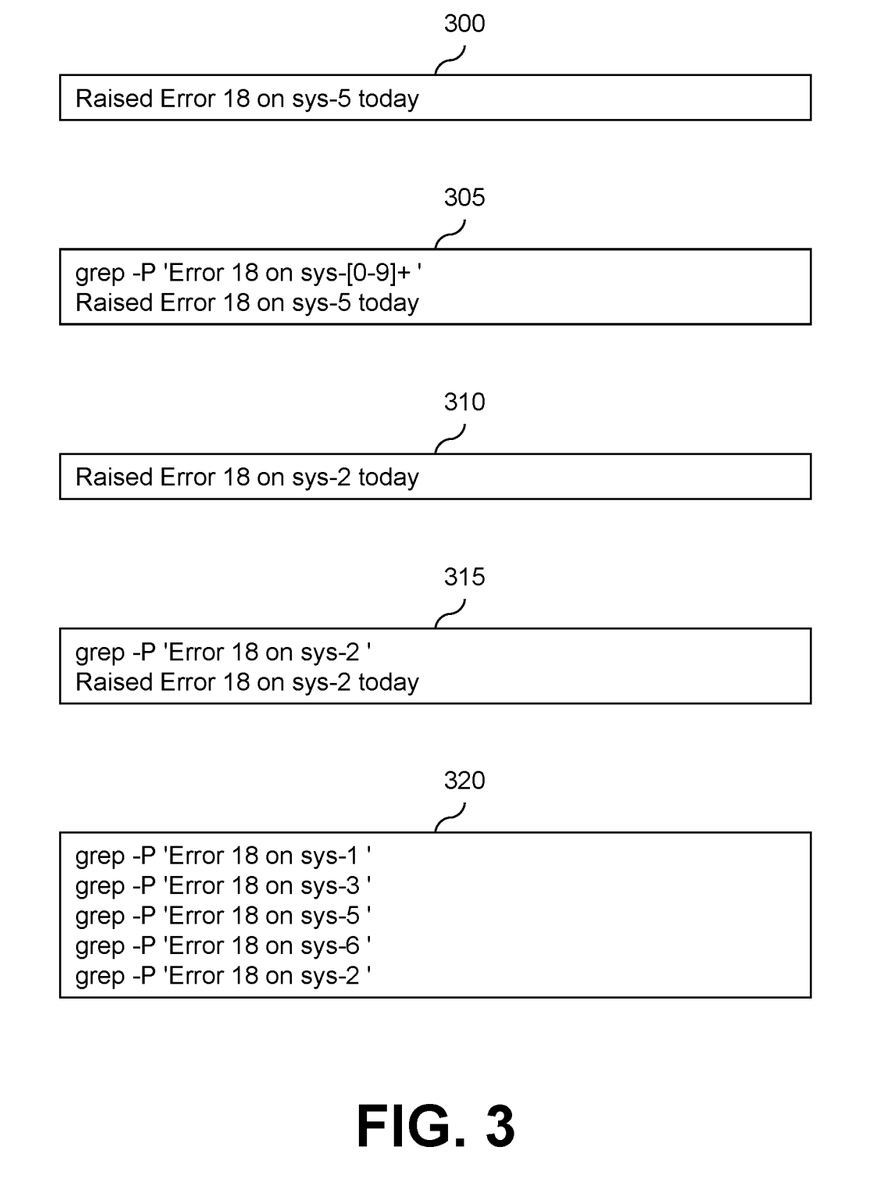
FIG. 3 shows examples of portions of log lines generated from automated testing of a set of information technology assets in an illustrative embodiment.

Consider, as an example, an error number "18" that can appear on any of six systems. A general pattern could duplicate instances on one system, but would also duplicate instances across systems, which reveals little about the condition of individual systems. FIG. 3 shows an example of a log line 300 including the error number 18, as well as an example of a general pattern 305 for this log line. Suppose a support engineer sees this first in Case-882. The definition for the general pattern could be configured under reference Case-882. Now suppose in the next instance, say Case-883, the log line 310 shown in FIG. 3 appears on another system. Here, the general pattern would match and the triage service would indicate a duplicate instance, even though the hardware problem is occurring on a different system. Looking to improve the accuracy of triage, the support engineer could define under reference Case-883 the specific pattern 315 shown in FIG. 3. This new specific pattern 315 would duplicate instances only on the one system (e.g., sys-2) and reveal its condition. While the support engineer could anticipate additional patterns, the additional patterns could not be defined until actual cases are encountered. The general pattern could notify of instances, but there is a need to respond manually to the cases involving new systems while ignoring duplicate cases until the set of patterns 320 shown in FIG. 3 is added. In the example 320, one system is missing (e.g., sys-4). Suppose that a reference case for sys-4 is never seen. In such a case, a pattern is not defined even though the support engineer could see the possibility. Such issues are exacerbated as the number of different types of errors and the number of systems or other IT assets being analyzed increases. For example, there may be 3 different error numbers and 100 systems, but only 15 of the systems may raise these errors and only a few may raise multiple errors in many instances.

Figure 4A:
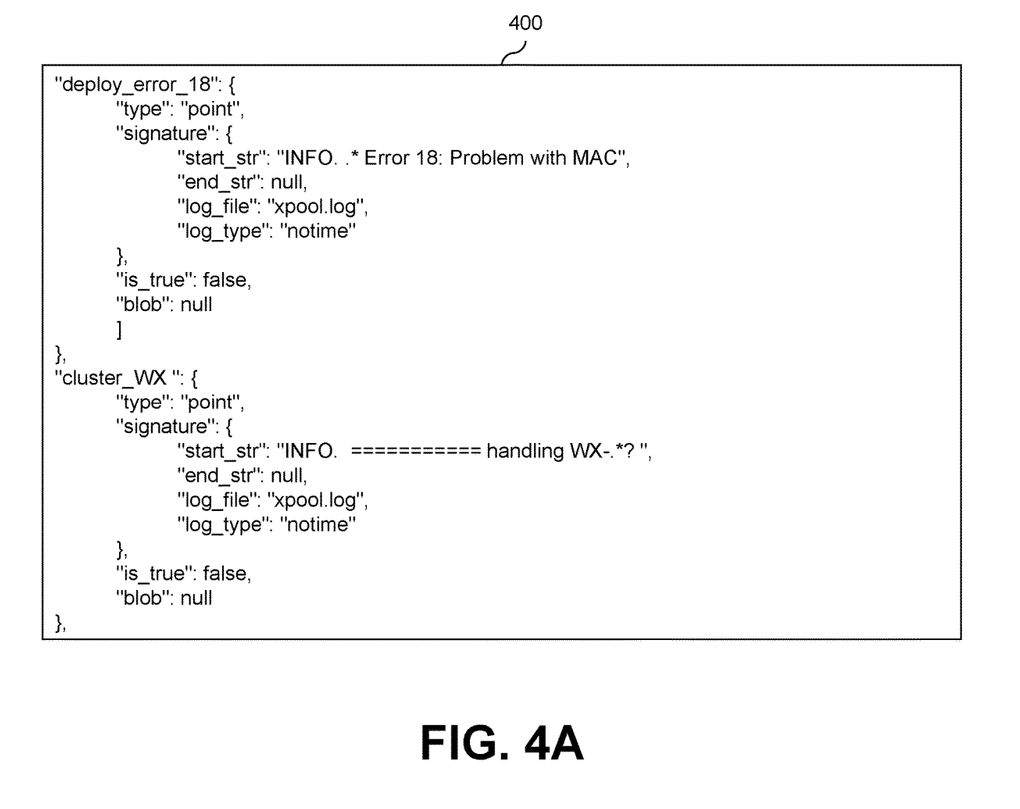
FIGS. 4A-4D show examples of pattern matching symptoms and diagnoses used for implementing self-enhancing functionality of a rule-based engine in an illustrative embodiment.
Figure 4B:
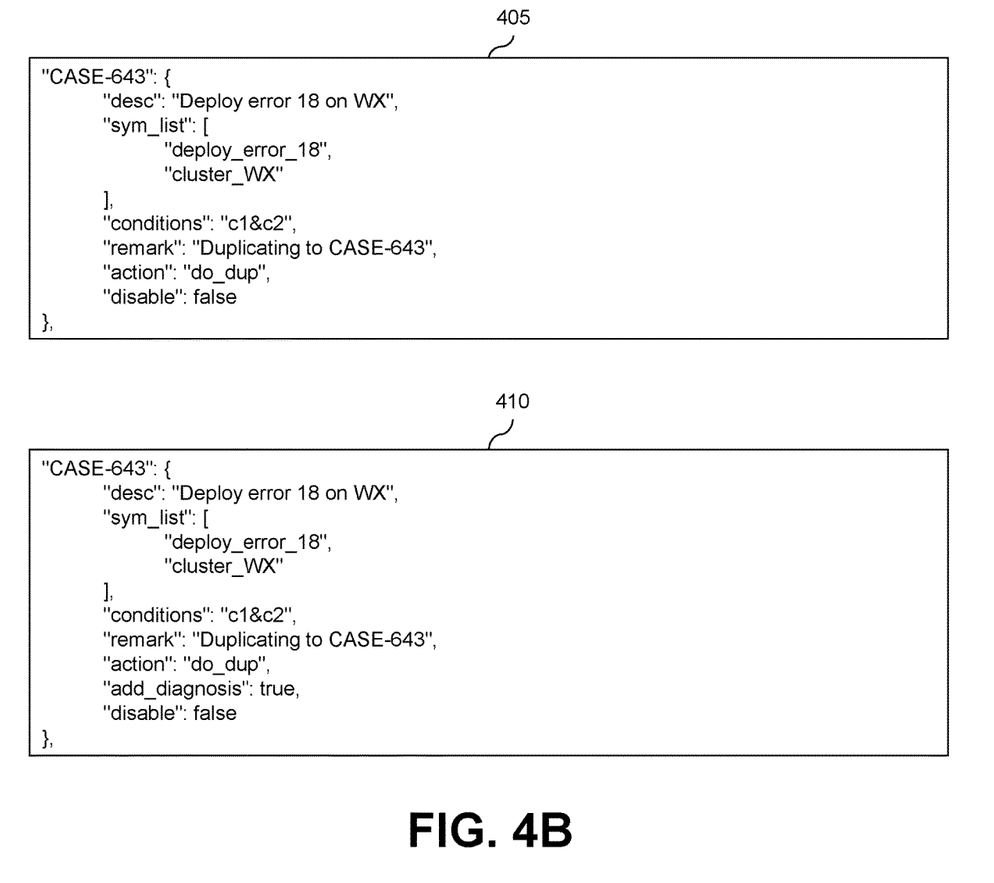

An automated triage service may be configured with symptoms and diagnoses for various issues. A symptom encodes a pattern to match in a log file by an expected name. FIG. 4A shows an example of a symptom pattern 400. A diagnosis determines a match to a reference case (e.g., when its associated symptoms match), and the diagnosis specifies a corresponding action to perform, such as marking the current case as a duplicate of the reference case for the diagnosis. Other possible actions are making a comment, assigning the case to a support team, linking the case to a related reference, etc. FIG. 4B shows an example of a diagnosis pattern 405, which includes a symptom list ("sym_list") and a remediation action ("action"). The symptoms and diagnoses may be manually written, or may be automatically generated. The technical solutions described herein further introduce an annotation for some diagnoses that enable the automated triage service to augment its own configuration in a recursive manner (e.g., to provide a self-enhancing automated triage service). An annotated diagnosis, when matched, could generate and write a new diagnosis, related in content to itself. The annotation may be included as an "add_diagnosis" parameter or line as shown in the diagnosis pattern 410 in FIG. 4B.

The annotation is added to the definition of the diagnosis, which relies on at least one symptom that encodes a broad pattern. Suppose we call this a broad symptom, where the definition of a broad system includes an annotation called "broad". As in the example above, a broad pattern might rely on a naming convention for a model of appliance or other type of IT asset. The symptom definition's pattern would match a line in triage data that reports the appliance name. Existing code stores a copy of that line as described below. New code would invoke "grep-oP" with the same pattern to extract the specific appliance or other IT asset name from the stored line. This extraction works because the broad symptom is defined to specify a regular expression that uses look-behind and look-ahead syntax (e.g., "start_str": "(?<=INFO. ==========handling) WX-.*?(?=)") as shown in the symptom pattern 415 in FIG. 4C.

Figure 4C:
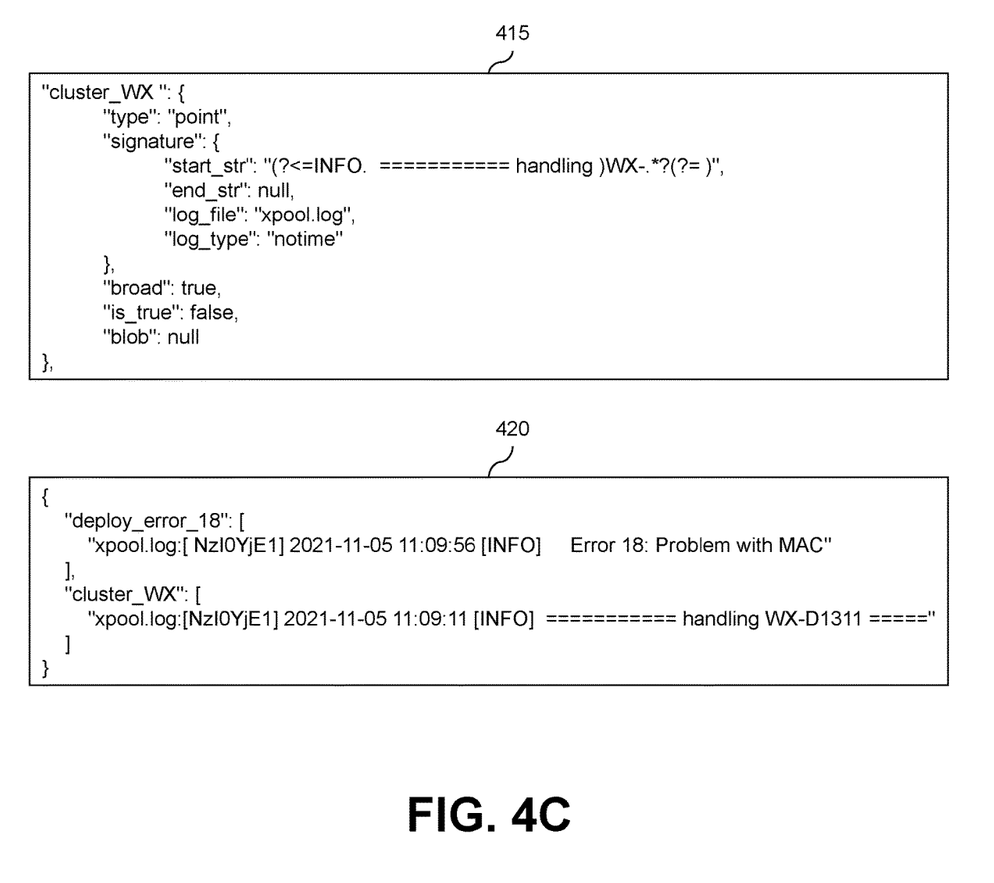

The self-enhancing automated triage service will recognize both the diagnosis and its associated symptoms, and scans specified files for the defined patterns. When the patterns match, the symptoms become "true" and the matched text for each is written to an "xray_detail.json" file. FIG. 4C shows a pattern-matching file snippet 420. When the "add_diagnosis" annotation is encountered, information is gathered for generating a specific diagnosis and a specific symptom. The current case number being processed can serve as a reference case, and matching symptoms have associated details as shown in the pattern-matching file snippet 420. The text of a matching line for each broad symptom, such as "cluster_WX" in the symptom pattern 415, is scanned with "grep-oP" to extract the specific match value. In an "xpool.log" example, the value is "WX-D1311".

Figure 4D:
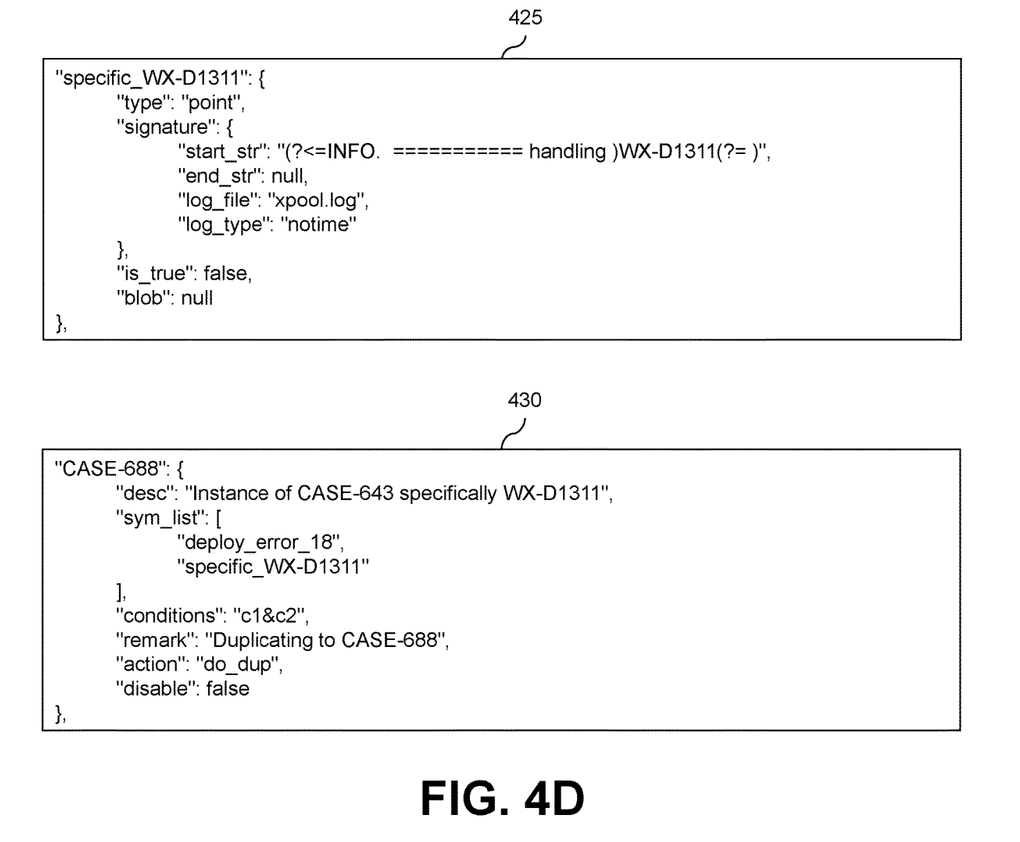

The self-enhancing automated triage service uses this value as it encodes a new symptom name with a prefix, such as "specific_WX-D1311". The new symptom definition is nearly a copy of the broad symptom ("cluster_WX"), except the general pattern is replaced by a specific pattern using the matched value and the "broad" annotation is removed as shown in the symptom pattern 425 shown in FIG. 4D. The replacement here occurs to the text between the look-behind and look-ahead expression in the syntax shown in the symptom pattern 415. The automated triage service generates a new diagnosis as nearly a copy of the annotated diagnosis, except that the annotation is removed and each broad symptom is replaced by a corresponding specific symptom. The key for the new diagnosis is the current case number. The description for the new diagnosis is "Instance of <annotated_diagnosis_key" specifically <match_value>". The name and description thus reflect a unique combination of symptomatic detail. FIG. 4D shows a diagnosis pattern 430 including the unique combination of symptomatic detail. Being nearly a copy of the annotated diagnosis, the new diagnosis pattern 430 will take the same action when matched (e.g., duplication or assignment of a ticket).

The new diagnosis pattern 430 and any associated new symptoms are inserted as entries in diagnosis and symptom dictionaries of the self-enhancing automated triage service. In some embodiments, such dictionaries are encoded as JavaScript Object Notation (JSON) files which are written to a local file system. These JSON files are referenced immediately by the self-enhancing automated triage service when it begins processing data from its next instance of a test failure. In the example of FIGS. 4A-4D, if a next instance encounters error 18 on WX-D1311 again, the new diagnosis pattern 430 will match and the case will be duplicated against CASE-688. If the next instance encounters error 18 on another WX cluster for the first time, the annotated diagnosis for CASE-643 will generate a new specific diagnosis pattern and specific symptom. In time, the automated triage service may encounter the error on some designated number of WX clusters (e.g., 15 of 100), and will generate corresponding specific diagnosis patterns, but no more than actually encountered and all with reference cases.

The technical solutions described herein provide self-enhancing functionality for rule-based failure analysis tools, such as automated triage services. The self-enhancing functionality operating in the rule-based failure analysis software automatically updates its own configuration files with new rules, which may be expressed as new symptoms and diagnoses based on patterns detected in data files. Thus, the technical solutions are able to enhance rule-based engines (e.g., in an automated triage service or other failure analysis tool) which perform failure analysis and take actions by ingesting large datasets, such as those gathered from automated testing of complex systems or other IT assets. The technical solutions thus provide various technical advantages relative to conventional approaches, which rely on manually written configurations to obtain the patterns and rules that govern their analyses.

In some embodiments, a rule-based engine implementing the self-enhancing functionality is advantageously configured to distinguish duplicate failure cases from new failure cases, so that an enterprise, organization or other entity can focus efforts on new problems uncovered from automated testing. IT infrastructure problems can present themselves as one problem on many IT assets, but an enterprise, organization or other entity operating the IT infrastructure may need to distinguish a duplicate instance on one IT asset from a first instance on a different IT asset. Manually configuring per-system or per-IT asset rules in the rule-based engine is impractical, expensive and may be infeasible depending on the number of IT assets in the IT infrastructure. The technical solutions enhance the rule-based engine to take an action in a general case, with the rule-based engine being configured to automatically write system or IT asset-specific rules which are added to its own configuration. The rule-based engine may be initially configured to "think" in general terms, where the self-enhancing functionality enables the rule-based engine to respond and write rules in specific terms. In situations where a general rule fits a large combinatorial space of possibilities, the data-driven nature of the self-enhancing functionality restricts the number of new rules only to instances encountered in that space. The self-enhancing functionality derives one or more specific rules from a general rule, where deriving one of the specific rules includes a pattern replacement from one regular expression to another, relying on a syntax convention, and substituting a part of a regular expression with the value that part matched.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated generation of pattern-matching rules in a rule-based analysis service will now be described in greater detail with reference to FIGS. 5 and 6. Although described in the context of system 100, these platforms may also be used to implement at least portions of other information processing systems in other embodiments.

Figure 5:
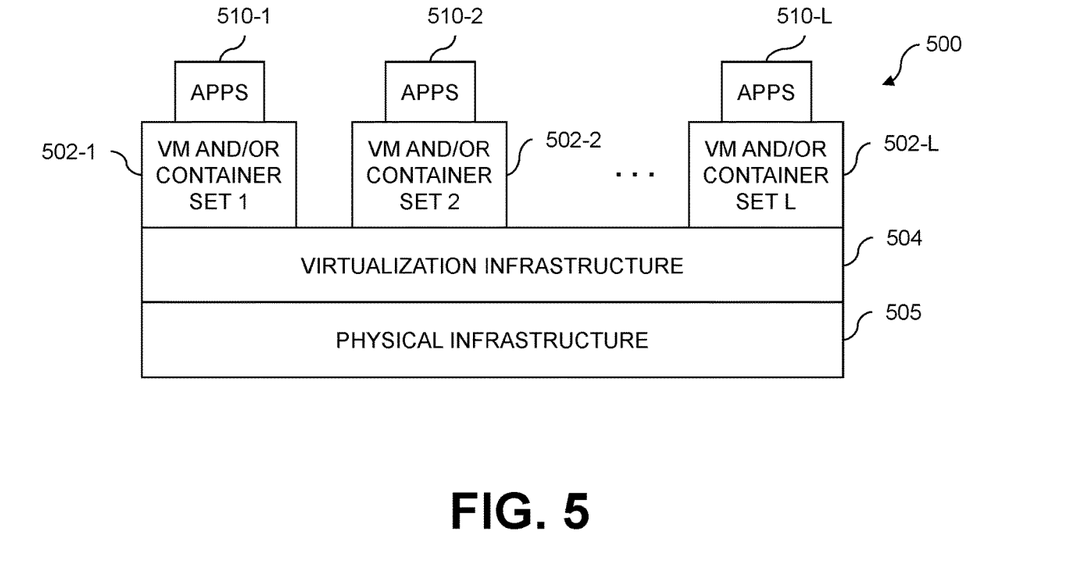
FIGS. 5 and 6 show examples of processing platforms that may be utilized to implement at least a portion of an information processing system in illustrative embodiments.
Figure 6:
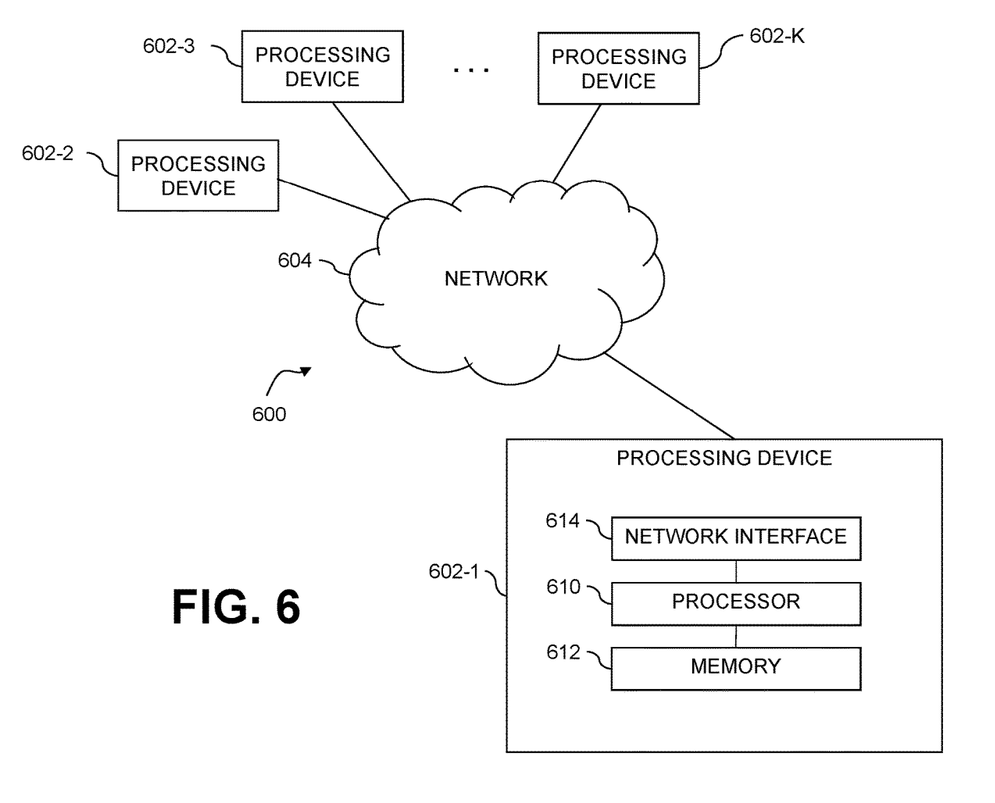

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated generation of pattern-matching rules in a rule-based analysis service as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to generate an annotation for a pattern-matching rule in a rule-based analysis service in an information technology infrastructure environment, the pattern-matching rule specifying one or more asset-generic patterns, the generated annotation comprising instructions for writing one or more additional pattern-matching rules in the rule-based analysis service in response to detecting at least one of the one or more asset-generic patterns on specific ones of a plurality of information technology assets in the information technology infrastructure environment;
        to monitor information associated with operation of the plurality of information technology assets in the information technology infrastructure environment;
        to detect, based at least in part on the monitored information, at least one of the one or more asset-generic patterns of the pattern-matching rule on a given one of the plurality of information technology assets;
        to generate a given additional pattern-matching rule for the rule-based analysis service, the given additional pattern-matching rule specifying (i) one or more asset-specific patterns and (ii) one or more actions to take in response to detecting at least one of the one or more asset-specific patterns; and
        to apply the one or more actions for the given information technology asset.

2. The apparatus of claim 1 wherein the monitored information comprises one or more system logs.

3. The apparatus of claim 2 wherein the one or more system logs are generated in conjunction with execution of one or more test cases on the plurality of information technology assets.

4. The apparatus of claim 2 wherein the one or more system logs are generated in conjunction with execution of one or more workloads on the plurality of information technology assets in a production environment.

5. The apparatus of claim 1 wherein generating the given additional pattern-matching rule comprises extracting an asset identifier of the given information technology asset from the monitored information and inserting the extracted asset identifier in at least one of the one or more asset-specific patterns.

6. The apparatus of claim 5 wherein extracting the asset identifier is based at least in part on a regular expression in the at least one asset-generic pattern, the regular expression utilizing look-behind and look-ahead syntax for isolating the asset identifier of the given information technology asset from the monitored information.

7. The apparatus of claim 6 wherein the at least one asset-specific pattern comprises the at least one asset-generic pattern having the regular expression replaced with the extracted asset identifier.

8. The apparatus of claim 1 wherein the one or more asset-generic patterns are defined utilizing a parameter which indicates an asset-generic symptom associated with one or more issues encountered on the plurality of information technology assets.

9. The apparatus of claim 1 wherein the pattern-matching rule is associated with a first reference case number and the given additional pattern-matching rule is associated with a second reference case number, the second reference case number being different than the first reference case number.

10. The apparatus of claim 9 wherein generating the given additional pattern-matching rule comprises inserting a description indicating that the given additional pattern-matching rule comprises an instance of the first reference case number for the given information technology asset.

11. The apparatus of claim 1 wherein the one or more actions to take in response to detecting at least one of the one or more asset-specific patterns specified in the given additional pattern-matching rule are selected based at least in part on one or more actions specified in the pattern-matching rule.

12. The apparatus of claim 1 wherein the one or more actions to take in response to detecting at least one of the one or more asset-specific patterns specified in the given additional pattern-matching rule are the same as one or more actions specified in the pattern-matching rule.

13. The apparatus of claim 1 wherein the one or more actions to take in response to detecting at least one of the one or more asset-specific patterns specified in the given additional pattern-matching rule comprise:
  for a first detection of the at least one asset-specific pattern, generating a support ticket for the given information technology asset; and
  for subsequent detection of the at least one asset-specific pattern following the first detection of the at least one asset-specific pattern, duplication of the support ticket for the given information technology asset.

14. The apparatus of claim 1 wherein the one or more actions to take in response to detecting at least one of the one or more asset-specific patterns specified in the given additional pattern-matching rule comprise at least one of:
  generating a comment for a reference case;
  assigning the reference case to a support team; and
  linking the reference case to one or more related reference cases.

15. A computer program product comprising a non-transitory processor-readable storage medium having stored therein program code of one or more software programs, wherein the program code when executed by at least one processing device causes the at least one processing device:
  to generate an annotation for a pattern-matching rule in a rule-based analysis service for an information technology infrastructure environment, the pattern-matching rule specifying one or more asset-generic patterns, the generated annotation comprising instructions for writing one or more additional pattern-matching rules in the rule-based analysis service in response to detecting at least one of the one or more asset-generic patterns on specific ones of a plurality of information technology assets in the information technology infrastructure environment;
  to monitor information associated with operation of the plurality of information technology assets in the information technology infrastructure environment;
  to detect, based at least in part on the monitored information, at least one of the one or more asset-generic patterns of the pattern-matching rule on a given one of the plurality of information technology assets;
  to generate a given additional pattern-matching rule in the rule-based analysis service, the given additional pattern-matching rule specifying (i) one or more asset-specific patterns and (ii) one or more actions to take in response to detecting at least one of the one or more asset-specific patterns; and
  to apply the one or more actions for the given information technology asset.

16. The computer program product of claim 15 wherein generating the given additional pattern-matching rule comprises extracting an asset identifier of the given information technology asset from the monitored information and inserting the extracted asset identifier in at least one of the one or more asset-specific patterns.

17. The computer program product of claim 15 wherein the pattern-matching rule is associated with a first reference case number and the given additional pattern-matching rule is associated with a second reference case number, the second reference case number being different than the first reference case number.

18. A method comprising:
  generating an annotation for a pattern-matching rule in a rule-based analysis service for an information technology infrastructure environment, the pattern-matching rule specifying one or more asset-generic patterns, the generated annotation comprising instructions for writing one or more additional pattern-matching rules in the rule-based analysis service in response to detecting at least one of the one or more asset-generic patterns on specific ones of a plurality of information technology assets in the information technology infrastructure environment;
  monitoring information associated with operation of the plurality of information technology assets in the information technology infrastructure environment;
  detecting, based at least in part on the monitored information, at least one of the one or more asset-generic patterns of the pattern-matching rule on a given one of the plurality of information technology assets;
  generating a given additional pattern-matching rule in the rule-based analysis service, the given additional pattern-matching rule specifying (i) one or more asset-specific patterns and (ii) one or more actions to take in response to detecting at least one of the one or more asset-specific patterns; and
  applying the one or more actions for the given information technology asset;
  wherein the method is performed by at least one processing device comprising a processor coupled to a memory.

19. The method of claim 18 wherein generating the given additional pattern-matching rule comprises extracting an asset identifier of the given information technology asset from the monitored information and inserting the extracted asset identifier in at least one of the one or more asset-specific patterns.

20. The method of claim 18 wherein the pattern-matching rule is associated with a first reference case number and the given additional pattern-matching rule is associated with a second reference case number, the second reference case number being different than the first reference case number.

* * * * *